US010078162B2

(12) United States Patent
Fujiki et al.

(10) Patent No.: US 10,078,162 B2
(45) Date of Patent: Sep. 18, 2018

(54) RETROREFLECTIVE MATERIAL

(71) Applicant: UNITIKA SPARKLITE LTD., Kyoto (JP)

(72) Inventors: Motomu Fujiki, Kyoto (JP); Atsumi Nishigaki, Kyoto (JP); Yasutaka Nishimura, Kyoto (JP)

(73) Assignee: UNITIKA SPARKLITE LTD., Kyoto (JP)

( * ) Notice: Subject to any disclaimer, the term of this patent is extended or adjusted under 35 U.S.C. 154(b) by 30 days.

(21) Appl. No.: 15/520,109

(22) PCT Filed: Aug. 31, 2015

(86) PCT No.: PCT/JP2015/074760
§ 371 (c)(1),
(2) Date: Apr. 19, 2017

(87) PCT Pub. No.: WO2016/063633
PCT Pub. Date: Apr. 28, 2016

(65) Prior Publication Data
US 2017/0322353 A1    Nov. 9, 2017

(30) Foreign Application Priority Data

Oct. 24, 2014  (JP) .................. 2014-217750

(51) Int. Cl.
*G02B 5/128*    (2006.01)
*G09F 13/16*    (2006.01)

(52) U.S. Cl.
CPC .............. *G02B 5/128* (2013.01); *G09F 13/16* (2013.01)

(58) Field of Classification Search
CPC .......... G02B 5/126; G02B 5/128; G09F 13/16
(Continued)

(56) References Cited

U.S. PATENT DOCUMENTS 3,700,305 A * 10/1972 Bingham ............... G02B 5/128
359/540
3,919,031 A    11/1975 White
(Continued)

FOREIGN PATENT DOCUMENTS

JP    51128293 A    11/1976
JP    57095411 A    6/1982
(Continued)

OTHER PUBLICATIONS

English translation of the International Search Report for PCT/JP2015/074760, dated Oct. 20, 2015.

*Primary Examiner* — Frank Font
(74) *Attorney, Agent, or Firm* — McDonald Hopkins LLC

(57) ABSTRACT

An object of the present invention is to provide a retroreflective material that shows high chroma for incident light with a wide angle, and can change the color tone of reflected light depending on the incident angle of the incident light, and also has reduced unevenness in the color of the reflected light. An open-type retroreflective material in which a transparent resin layer and a reflective layer formed of a transparent metal compound thin film are laminated between a transparent microsphere and a fixing resin layer, and the layer thickness of the transparent resin layer is set to satisfy predetermined conditions, can show high chroma for incident light with a wide angle, and can change the color tone of reflected light depending on the incident angle of the incident light, and can also have reduced color unevenness.

9 Claims, 3 Drawing Sheets

(58) Field of Classification Search
USPC .................................. 359/536, 538, 539, 540
See application file for complete search history.

(56) References Cited

U.S. PATENT DOCUMENTS

| | | | | |
|---|---|---|---|---|
| 4,763,985 A * | 8/1988 | Bingham | ............... | G02B 5/128 359/518 |
| 5,080,463 A * | 1/1992 | Faykish | ................ | B42D 25/29 283/85 |
| 5,785,790 A * | 7/1998 | Olsen | ................... | B44C 1/1712 156/239 |
| 6,247,818 B1 * | 6/2001 | Hedblom | ......... | B29D 11/00615 359/539 |
| 6,365,262 B1 * | 4/2002 | Hedblom | ................ | E01F 9/524 359/536 |
| 6,966,660 B1 * | 11/2005 | Buccellato | ............ | G02B 5/128 359/534 |
| 2002/0142121 A1 * | 10/2002 | Hingsen-Gehrmann | | G02B 5/128 428/40.1 |
| 2005/0162742 A1 | 7/2005 | Fleming et al. | | |
| 2006/0098286 A1 * | 5/2006 | Sagar | ..................... | G02B 5/128 359/530 |
| 2006/0237124 A1 * | 10/2006 | Bartoli | ................. | A41D 13/01 156/247 |
| 2006/0256439 A1 | 11/2006 | Yukawa et al. | | |
| 2009/0097114 A1 * | 4/2009 | Mimura | ................. | G02B 5/128 359/463 |
| 2010/0147949 A1 * | 6/2010 | Sakuma | ................. | G02B 5/128 235/462.1 |
| 2011/0038048 A1 * | 2/2011 | Kobayashi | ............. | G02B 5/128 359/537 |
| 2012/0200709 A1 * | 8/2012 | Nakajima | ............. | G02B 5/128 348/148 |
| 2013/0250419 A1 | 9/2013 | Lochbihler | | |
| 2014/0022641 A1 * | 1/2014 | Yoon | ..................... | G02B 5/128 359/538 |
| 2014/0092474 A1 | 4/2014 | Kobayashi et al. | | |
| 2017/0131444 A1 * | 5/2017 | Xia | ......................... | G02B 5/128 |
| 2017/0146704 A1 * | 5/2017 | Edwards | ................ | G02B 5/128 |

FOREIGN PATENT DOCUMENTS

| | | |
|---|---|---|
| JP | 60217302 A | 10/1985 |
| JP | 02093684 A | 4/1990 |
| JP | 04263202 A | 9/1992 |
| JP | 2001318214 A | 11/2001 |
| JP | 2007121521 A | 5/2007 |
| JP | 2007517265 A | 6/2007 |
| JP | 2013508748 A | 3/2013 |
| JP | 5248496 B2 | 4/2013 |
| WO | 2005088359 A1 | 9/2005 |

* cited by examiner

RETROREFLECTIVE MATERIAL

CROSS-REFERENCE TO RELATED APPLICATION

This application is a 35 U.S.C. 371 national stage filing of PCT Application No. PCT/JP2015/074760, filed on Aug. 31, 2015, which claims the benefit of Japanese Patent Application No. 2014-217750, filed on Oct. 24, 2014, both of which are incorporated herein in their entirety by reference.

TECHNICAL FIELD

The present invention relates to a retroreflective material that retroreflects incident light. More specifically, the present invention relates to a retroreflective material that shows high chroma for incident light with a wide angle, and can change the color tone of reflected light depending on the incident angle of the incident light, and also have reduced unevenness in the color of the reflected light.

BACKGROUND ART

Conventionally, retroreflective materials that retroreflect incident light are widely used for indications such as traffic signs, or for identification of marine accident equipment, and particularly for enhancing visibility at nighttime. From the viewpoint of ensuring the safety of people who work at night, such retroreflective materials are also widely used as safety clothing for policemen, firefighters, workers involved in civil engineering and construction, and the like, in safety clothes, safety vests, sashes, arm bands, life vests, and the like. Further, in recent years, along with a growing consciousness of the safety of life, or the diversification of decorativeness, such retroreflective materials are also used in apparel such as windbreakers, sweat suits, T-shirts, sports shoes, and swimming suits as measures for preventing traffic accidents at nighttime, or used in bags, suitcases, and the like for decorative purposes.

A typical retroreflective material has a structure in which transparent microspheres are provided on a reflective layer, whereby light incident through the transparent microspheres is reflected at the reflective layer, and light is emitted through the transparent microspheres, so that light is retroreflected. In the retroreflective material with such a structure, a transparent resin layer may be provided between the reflective layer and the transparent microspheres to adjust the reflective luminance or the color tone of the reflected light. Conventional retroreflective materials are broadly classified into the three types, i.e., an open type, a closed type, and an encapsulated type, depending on the manner in which the transparent microspheres are embedded. In an open-type retroreflective material, a portion of the transparent microspheres are exposed in the air (see, for example, Patent Literature 1). In a closed-type retroreflective material, surfaces of the transparent microspheres (surfaces positioned opposite to the surfaces facing the reflective layer) are covered with a resin layer (see, for example, Patent Literature 2). In an encapsulated-type retroreflective material, there is space over the surfaces of the transparent microspheres (surfaces positioned opposite to the surfaces facing the reflective layer), and a resin layer is present over that space (see, for example, Patent Literature 3). Among these types, open-type retroreflective materials find wide application in the field of clothing, because they have high reflective luminance as well as flexibility.

In recent years, in response to consumer needs such as the diversification of decorativeness and a growing liking for high-grade products, there is a demand for the development of a retroreflective material that can display original colors. To meet such consumer needs, some retroreflective materials have previously been reported which not only exhibit a monochromatic color tone, but also exhibit a plurality of colors depending on the incident angle of incident light. Patent Literature 4, for example, discloses a retroreflective material including a single-layer interference layer (reflective layer) composed of a specific metal compound directly deposited on transparent microspheres, wherein gradations within the range of 100 to 600 nm are imparted to the layer thickness of the interference layer, which allows a plurality of color tones to be produced depending on the incident angle of incident light. The retroreflective material disclosed in Patent Literature 4, however, has a drawback in that with respect to incident light with the same incident angle, the hue of the reflected light is uneven depending on the region of the retroreflective material, and color unevenness readily occurs. Thus, this retroreflective material cannot thoroughly satisfy the consumer needs that have grown recently. Further, in the retroreflective material described in Patent Literature 4, the single-layer interference layer (reflective layer) composed of a specific metal compound is directly deposited on the transparent microspheres; in this structure, however, the thickness of the interference layer needs to be increased to approximately 400 nm to obtain more multicolored interference colors, leading to a very high vapor deposition cost.

CITATION LIST

Patent Literature

Patent Literature 1: JP 2001-318214 A
Patent Literature 2: JP S60-217302 A
Patent Literature 3: JP H2-93684 A
Patent Literature 4: JP 5248496 B

SUMMARY OF INVENTION

Technical Problem

An object of the present invention is to provide a retroreflective material that shows high chroma for incident light with a wide angle, and can change the color tone of reflected light depending on the incident angle of the incident light, and also has reduced unevenness in the color of the reflected light.

Solution to Problem

The present inventors conducted extensive research to solve the aforementioned problem, and found that an open-type retroreflective material in which a transparent resin layer and a reflective layer formed of a transparent metal compound thin film are laminated between a transparent microsphere and a fixing resin layer, and the layer thickness of the transparent resin layer is set to satisfy predetermined conditions, can show high chroma for incident light with a wide angle, and can change the color tone of the reflected light depending on the incident angle of the incident light, and can also have reduced color unevenness. The present invention was completed as a result of further research based on this finding.

In summary, the present invention provides aspects of the retroreflective material as itemized below.

Item 1. A retroreflective material comprising:
a fixing resin layer;
a transparent microsphere embedded in the fixing resin layer; and
a transparent resin layer and a reflective layer formed of a transparent metal compound thin film, between the transparent microsphere and the fixing resin layer, sequentially from the transparent microsphere side,
the transparent resin layer having a layer thickness $L_{(90°)}$ of 400 to 1000 nm and having a ratio of a layer thickness $L_{(30°)}$ to the layer thickness $L_{(90°)}$ of 1.35 to 1.50, where:

layer thickness $L_{(90°)} = Y_{(90°)} - X_{(90°)}$;

layer thickness $L_{(30°)} = Y_{(30°)} - X_{(30°)}$;

$X_{(90°)}$: a distance from a central point of the transparent microsphere to an interface between the transparent microsphere and the transparent resin layer in a 90° direction with respect to a plane direction;

$Y_{(90°)}$: a distance from the central point of the transparent microsphere to an interface between the transparent resin layer and the reflective layer in the 90° direction with respect to the plane direction;

$X_{(30°)}$: a distance from the central point of the transparent microsphere to the interface between the transparent microsphere and the transparent resin layer in a 30° direction with respect to the plane direction; and $Y_{(30°)}$: a distance from the central point of the transparent microsphere to the interface between the transparent resin layer and the reflective layer in the 30° direction with respect to the plane direction.

Item 2. The retroreflective material according to item 1, wherein the transparent resin layer has a ratio of a layer thickness $L_{(60°)}$ to the layer thickness $L_{(90°)}$ of 1.01 to 1.25, where:

layer thickness $L_{(60°)} = Y_{(60°)} - X_{(60°)}$;

$X_{(60°)}$: a distance from the central point of the transparent microsphere to the interface between the transparent microsphere and the transparent resin layer in a 60° direction with respect to the plane direction; and $Y_{(60°)}$: a distance from the central point of the transparent microsphere to the interface between the transparent resin layer and the reflective layer in the 60° direction with respect to the plane direction.

Item 3. The retroreflective material according to item 1 or 2, wherein the reflective layer has a layer thickness of 90 to 240 nm.

Item 4. The retroreflective material according to any one of items 1 to 3, wherein a ratio of the layer thickness of the reflective layer to the layer thickness $L_{(90°)}$ of the transparent resin layer is 100:120-1300.

Item 5. The retroreflective material according to any one of items 1 to 4, wherein a resin forming the transparent resin layer is a polyurethane resin.

Item 6. The retroreflective material according to any one of items 1 to 5, wherein a constituent material of the transparent metal compound thin film forming the reflective layer is ZnS.

Item 7. The retroreflective material according to any one of items 1 to 6, wherein the transparent microsphere is made of glass.

Item 8. The retroreflective material according to any one of items 1 to 7, wherein the transparent microsphere has a refractive index of 1.6 to 2.5.

Item 9. The retroreflective material according to any one of items 1 to 8, wherein the fixing resin layer is held on a support.

Advantageous Effects of Invention

In the retroreflective material of the present invention, the hue of the reflected light for incident light with the same incident angle is prevented from becoming uneven depending on the region of the retroreflective material, allowing color unevenness to be reduced. Further, the retroreflective material of the present invention can show high chroma for incident light with a wide angle, and can also cause the color tone to be changed to a plurality of color tones in response to changes in the incident angle of the incident light.

The retroreflective material of the present invention can exhibit diverse colors with high chroma depending on the direction in which it is visually seen, while having reduced color unevenness, and thus, can achieve an improvement in decorativeness or high-grade image, as well as an improvement in visibility (particularly visibility at nighttime). As described above, because the retroreflective material of the present invention has excellent characteristics in terms of decorativeness, high-grade image, visibility, and the like, it can be used in a variety of fields such as safety clothing, apparel, bags, suitcases, and shoes.

DESCRIPTION OF EMBODIMENTS

Figure 1:
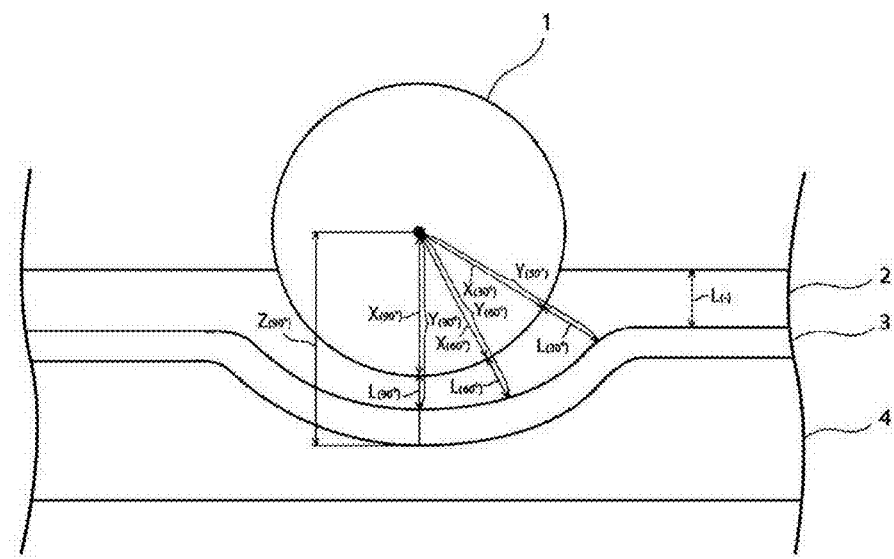
FIG. 1 is an enlarged diagram of a cross-sectional structure of one embodiment of the retroreflective material of the present invention.

1. Structure and Constituent Materials of Retroreflective Material

The retroreflective material of the present invention is an open-type retroreflective material in which a transparent microsphere 1, a transparent resin layer 2, a reflective layer 3, and a fixing resin layer 4 are sequentially laminated, and the layer thickness of the transparent resin layer is set to satisfy predetermined conditions. The retroreflective material of the present invention may also optionally include a support 5 as a substrate for holding the fixing resin layer 4, on a lower surface of the fixing resin layer (the surface opposite to the reflective layer 3). The structure and constituent materials of the retroreflective material of the present invention will be hereinafter described.

[Transparent Microsphere 1]

The transparent microsphere 1, which is embedded in the fixing resin layer 4 with the transparent resin layer 2 and reflective layer 3 therebetween, serves to allow incident light and emitted light retroreflected at the above-described reflective layer to pass through.

The transparent microsphere 1 generally has an average particle size of 30 to 200 µm, preferably 40 to 120 µm, and still more preferably 40 to 90 µm, for example, although not particularly limited thereto. The average particle size of the transparent microsphere 1 herein represents a value obtained by measuring the maximum diameter of each of 30 transparent microspheres 1, using a microscope under 500 times magnification, and by calculating an average value of the maximum diameters.

In the retroreflective material of the present invention, the ratio (exposure ratio) of the transparent microsphere 1 exposed in the air is 40 to 80%, preferably 40 to 60%, and more preferably 45 to 55%, for example, although is not particularly limited thereto. As used herein, the exposure ratio of the transparent microsphere 1 refers to the ratio (%) of the height of the region where the transparent microsphere 1 is exposed in the air, relative to the diameter of the transparent microsphere 1, and represents a value calculated in accordance with the following equation:

$$\text{exposure ratio (\%) of the transparent microsphere } 1 = (T/R) \times 100, \text{ where:}$$

R: the diameter of the transparent microsphere 1; and

T: the height from the top part of the surface of the transparent resin layer 2 (the surface of the region of the transparent resin layer 2 exposed in the air) to the top part of the surface of the transparent microsphere 1 exposed in the air.

The above-described exposure ratio herein represents a value calculated as an average value of exposure ratios measured for 30 or more transparent microspheres 1 embedded in the retroreflective material.

In the retroreflective material of the present invention, the number of transparent microspheres 1 embedded per unit area may be set as appropriate, depending on the characteristics to be imparted and the like. For example, the number of transparent microspheres 1 is 50 to 500, preferably 100 to 400, and more preferably 150 to 300, per mm$^2$ of the retroreflective material.

The constituent material of the transparent microsphere 1 may be any material that can achieve retroreflection, and has a refractive index of 1.6 to 2.5, preferably 1.9 to 2.3, and more preferably 1.9 to 2.1, for example, although not particularly limited thereto.

While the constituent material of the transparent microsphere 1 may be any of glass and a resin, for example, glass is suitably used in the present invention because it is excellent in transparency, chemical resistance, wash resistance, weather resistance, and the like.

[Transparent Resin Layer 2]

The transparent resin layer 2 is a layer provided between the transparent microsphere 1 and the reflective layer 3. Because the retroreflective material of the present invention includes the reflective layer 3 with the transparent resin layer 2 satisfying the below-described predetermined conditions for the layer thickness, it can show high chroma for incident light with a wide angle, can change the color tone of reflected light depending on the incident angle of the incident light, and can have reduced color unevenness.

In the transparent resin layer 2, a layer thickness $L_{(90°)}$ in a 90° direction with respect to a plane direction from a central point of the transparent microsphere 1 is set from 400 to 1000 nm. From the viewpoint of changing the color tone of reflected light depending on the incident angle of incident light, while reducing the occurrence of color unevenness more effectively, the layer thickness $L_{(90°)}$ of the transparent resin layer 2 is preferably 570 to 1000 nm, more preferably 560 to 880 nm, still more preferably 570 to 800 nm, and particularly preferably 570 to 700 nm, for example. As used herein, the layer thickness $L_{(90°)}$ of the transparent resin layer 2 specifically represents a value calculated in accordance with the following equation, and the relationship between the layer thicknesses $L_{(90°)}$, $X_{(90°)}$, and $Y_{(90°)}$ is schematically shown in FIG. 1:

$$\text{layer thickness } L_{(90°)} = Y_{(90°)} - X_{(90°)}, \text{ where:}$$

$X_{(90°)}$: a distance from the central point of the transparent microsphere 1 to an interface between the transparent microsphere 1 and the transparent resin layer 2 in the 90° direction with respect to the plane direction; and $Y_{(90°)}$: a distance from the central point of the transparent microsphere 1 to an interface between the transparent resin layer 2 and the reflective layer 3 in the 90° direction with respect to the plane direction.

Further, in the transparent resin layer 2, a ratio of a layer thickness $L_{(30°)}$ in a 30° direction with respect to the plane direction from the central point of the above-described transparent microsphere 1, relative to the above-described layer thickness $L_{(90°)}$, (layer thickness $L_{(30°)}$/layer thickness $L_{(90°)}$), is set from 1.35 to 1.50. When the layer thickness of the transparent resin layer 2 is changed so that the layer thickness $L_{(30°)}$/layer thickness $L_{(90°)}$ falls within the above-mentioned range, while the above-described range of layer thicknesses $L_{(90°)}$ is satisfied, the color tone of reflected light can be changed depending on the incident angle of incident light, while the occurrence of color unevenness is reduced. From the viewpoint of changing the color tone of reflected light depending on the incident angle of incident light, while reducing the occurrence of color unevenness more effectively, the layer thickness $L_{(30°)}$/layer thickness $L_{(90°)}$ is preferably 1.35 to 1.48, more preferably 1.41 to 1.46, and still more preferably 1.44 to 1.46, for example. As used herein, the layer thickness $L_{(30°)}$ of the transparent resin layer 2 specifically represents a value calculated in accordance with the following equation, and the relationship between the layer thicknesses $L_{(30°)}$, $X_{(30°)}$, and $Y_{(30°)}$ is schematically shown in FIG. 1:

$$\text{layer thickness } L_{(30°)} = Y_{(30°)} - X_{(30°)}, \text{ where:}$$

$X_{(30°)}$: a distance from the central point of the transparent microsphere 1 to the interface between the transparent microsphere 1 and the transparent resin layer 2 in the 30° direction with respect to the plane direction; and $Y_{(30°)}$: a distance from the central point of the transparent microsphere 1 to the interface between the transparent resin layer 2 and the reflective layer 3 in the 30° direction with respect to the plane direction.

The layer thickness $L_{(30°)}$ of the transparent resin layer 2 may be set as appropriate in a range satisfying the above-described layer thickness $L_{(30°)}$/layer thickness $L_{(90°)}$, and is specifically 560 to 1500 nm, preferably 820 to 1240 nm, more preferably 830 to 1200 nm, and still more preferably 830 to 1000 nm, for example.

In the transparent resin layer 2, a layer thickness $L_{(60°)}$ in a 60° direction with respect to the plane direction from the central point of the above-described transparent microsphere 1 is not particularly limited; however, from the viewpoint of changing the color tone of reflected light depending on the incident angle of incident light, while reducing the occurrence of color unevenness more effectively, a ratio of the layer thickness $L_{(60°)}$ to the above-described layer thickness $L_{(90°)}$ (layer thickness $L_{(60°)}$/layer thickness $L_{(90°)}$) is set to 1.01 to 1.25, preferably 1.05 to 1.20, more preferably 1.07 to 1.13, and still more preferably 1.07 to 1.10. As used herein, the layer thickness $L_{(60°)}$ of the transparent resin layer 2 specifically represents a value calculated in accordance with the following equation, and the relationship between the layer thicknesses $L_{(60°)}$, $X_{(60°)}$, and $Y_{(60°)}$ is schematically shown in FIG. 1:

$$\text{layer thickness } L_{(60°)} = Y_{(60°)} - X_{(60°)}, \text{ where:}$$

$X_{(60°)}$: a distance from the central point of the transparent microsphere 1 to the interface between the transparent microsphere 1 and the transparent resin layer 2 in the 60° direction with respect to the plane direction; and $Y_{(60°)}$: a distance from the central point of the transparent microsphere 1 to the interface between the transparent resin layer 2 and the reflective layer 3 in the 60° direction with respect to the plane direction.

The layer thickness $L_{(60°)}$ of the transparent resin layer 2 is specifically 550 to 1200 nm, preferably 620 to 1200 nm, and more preferably 620 to 800 nm, for example.

Further, in the transparent resin layer 2, a layer thickness $L_{(-)}$ of a region not in contact with the above-described transparent microsphere 1 (the region between two of the above-described transparent microspheres) is 5000 to 20000 nm, preferably 8000 to 15000 nm, and more preferably 8000 to 12000 nm, for example, although is not particularly limited thereto. As used herein, the layer thickness $L_{(-)}$ of the transparent resin layer 2 refers to a distance from the interface between the transparent resin layer 2 and the reflective layer 3, to the transparent resin layer 2 exposed in the air in the 90° direction with respect to the plane direction. The layer thickness $L_{(-)}$ of the transparent resin layer 2 is schematically shown in FIG. 1.

While the resin forming the transparent resin layer 2 is not particularly limited as long as it has optical transparency, examples thereof include acrylic resins, polyurethane resins, and polyester resins. A polyurethane resin is preferred, for example, particularly from the viewpoint of further reducing the color unevenness of reflected light. The resin forming the transparent resin layer 2 may optionally be copolymerized with a silane coupling agent, for the purpose of imparting durability, adhesiveness, and the like to the transparent resin layer 2. Further, the resin forming the transparent resin layer 2 may optionally be cross-linked with a cross-linking agent such as a polyisocyanate cross-linking agent, an epoxy cross-linking agent, or a melamine resin, for the purpose of imparting heat resistance, wash resistance, and the like to the transparent resin layer 2.

The transparent resin layer 2 may also contain additives such as ultraviolet absorbents, antioxidants, dyes, pigments, phosphorescent pigments, and inorganic fillers, depending on the use, required function, and the like of the retroreflective material.

The transparent resin layer 2 may optionally be provided with a decoration such as a pattern or letters on a surface thereof not in contact with the transparent microsphere 1 (i.e., the surface exposed in the air).

[Reflective Layer 3]

The reflective layer 3 is a layer provided between the transparent resin layer 2 and the fixing resin layer 4. The reflective layer 3 serves to retroreflect light incident from the transparent microsphere, and contributes to high chroma for incident light with a wide angle, as well as changing of the color tone of reflected light depending on the incident angle of the incident light.

The layer thickness of the reflective layer 3 is not particularly limited, and is set as appropriate, depending on the retroreflective performance to be imparted, or the kinds of color tones of reflected light to be changed. However, from the viewpoint of more effectively achieving high chroma for incident light with a wide angle, and changing the color tone of reflected light depending on the incident angle of the incident light, while reducing costs, the layer thickness of the reflective layer 3 is 90 to 240 nm, preferably 90 to 200 nm, more preferably 110 to 190 nm, and particularly preferably 140 to 160 nm, for example.

The range of 90 to 240 nm corresponds to the so-called first-order range where interference colors are usually less likely to be obtained, and the color tone cannot be effectively changed to diverse color tones by using the method that involves directly depositing a single-layer reflective layer composed of a specific metal compound. On the other hand, in accordance with the present invention, even if the layer thickness of the reflective layer 3 is 90 to 240 nm, the provision of the specific transparent resin layer 2 between the transparent microsphere 1 and the reflective layer 3 allows the color tone to be effectively changed to diverse color tones.

In the present invention, the layer thickness of the reflective layer 3 represents a value calculated in accordance with the following equation:

$$\text{layer thickness of the reflective layer } 3 = Z_{(90°)} - Y_{(90°)}, \text{ where:}$$

$Y_{(90°)}$: the distance from the central point of the transparent microsphere 1 to the interface between the transparent resin layer 2 and the reflective layer 3 in the 90° direction with respect to the plane direction; and $Z_{(90°)}$: a distance from the central point of the transparent microsphere 1 to an interface between the reflective layer 3 and the fixing resin layer 4 in the 90° direction with respect to the plane direction.

A ratio of the layer thickness of the reflective layer 3 to the layer thickness of the transparent resin layer 2 is not particularly limited; however, from the viewpoint of changing the color tone of reflected light depending on the incident angle of incident light, while reducing the occurrence of color unevenness more effectively, the ratio of the layer thickness of the reflective layer 3 to the above-described layer thickness $L_{(90°)}$ of the transparent resin layer 2 is set to 100:120-1300, preferably 100:160-1100, more preferably 100:200-900, and particularly preferably 100:380-500, for example.

The reflective layer 3 is formed by a thin film of a transparent metal compound (transparent metal compound thin film) that allows light to pass through. While the refractive index of the transparent metal compound thin film forming the reflective layer 3 is not particularly limited as long as it can achieve retroreflection, it is 2.0 to 2.8, preferably 2.1 to 2.7, and more preferably 2.2 to 2.6, for example, although is not particularly limited thereto.

While the constituent material of the transparent metal compound thin film forming the reflective layer 3 is not particularly limited as long as it can retroreflect light incident from the transparent microsphere, examples thereof include ZnS, CdS, $CeO_2$, CsI, GaAs, Ge, InAs, InP, InSb, $ZrO_2$, $Bi_2O_3$, ZnSe, $WO_3$, PbS, PbSe, PbTe, RbI, Si, $Ta_2O_3$, Te, and $TiO_2$. Among these metals, ZnS is preferred, for example. Particularly when ZnS is used, and the layer thickness of the reflective layer 3 is set to 140 to 160 nm, the below-described maximum value of the retroreflective performance when the incident angle is changed from 5 to 50° is likely to satisfy the range of 30 to 60 $cd/lx/m^2$, which is more preferred. Examples of non-transparent constituent materials of metal thin films include Al, Ag, Cr, Ni, Mg, Au, and Sn, and because these materials merely exhibit a monochromatic color tone, they are inappropriate as the constituent material of the transparent metal compound thin film forming the reflective layer 3 of the present invention.

[Fixing Resin Layer 4]

The fixing resin layer 4 is a layer provided on a lower surface of the reflective layer 3, and serves to hold the transparent microsphere embedded therein.

The resin forming the fixing resin layer 4 is not particularly limited as long as it can hold the transparent microsphere 1 embedded therein, and may be selected as appropriate in consideration of flexibility and the like required in the retroreflective material. Examples of resins forming the fixing resin layer 4 include polyolefin resins (polyethylene, polypropylene, etc.), ethylene-vinyl acetate copolymer resins, polyvinyl alcohols, acrylic resins, urethane resins, and ester resins. Among the above, a urethane resin is preferred, for example, from the viewpoint of imparting excellent flexibility.

The resin forming the fixing resin layer 4 may optionally be copolymerized with a silane coupling agent. Through this copolymerization with a silane coupling agent, the fixing resin layer 4 can be provided with durability, adhesiveness, and the like. Further, the resin forming the fixing resin layer 4 may optionally be cross-linked with a cross-linking agent such as a polyisocyanate cross-linking agent, an epoxy cross-linking agent, or a melamine resin. Through this cross-linking with a cross-linking agent, the fixing resin layer 4 can be provided with heat resistance, wash resistance, and the like.

The fixing resin layer 4 may also contain additives such as dyes, pigments, phosphorescent pigments, and inorganic fillers, depending on the use, required function, and the like of the retroreflective material.

While the thickness of the fixing resin layer 4 is not particularly limited as long as it can hold the transparent microsphere 1 embedded therein, the thickness is 15 to 300 m, and preferably 20 to 200 m, for example.

[Support 5]

The support 5 is an optional member, and serves as a substrate for holding the fixing resin layer 4. In the retroreflective material of the present invention, the support 5 may not be provided in the distribution stage, for example. The support 5 may be directly laminated on the fixing resin layer 4, or may be laminated on the fixing resin layer 4 with an adhesive layer formed of an adhesive therebetween.

The constituent material forming the support 5 may be selected as appropriate in light of the use, required strength and flexibility, and the like of the retroreflective material. Specific examples of constituent materials of the support 5 include natural fibers such as pulp; resins such as polyesters, for example, polyethylene terephthalate and polyethylene naphthalate; and metals. While the form of the support 5 is not particularly limited, the support 5 may be in the form of a sheet such as a woven knit, a nonwoven fabric, a film, or paper; threads; or cords, for example.

2. Performance and Use of Retroreflective Material

The retroreflective material of the present invention can show high chroma for incident light with a wide angle, i.e., 0° to approximately 85°, and can change the color tone of reflected light clearly to a plurality of color tones depending on the incident angle of the incident light, and also allows diverse color tones to be displayed depending on the direction in which it is visually seen. As used herein, the incident angle of incident light represents a value when the direction perpendicular to the plane direction of the retroreflective material is defined as 0° (i.e., the plane direction of the retroreflective material is defined as 90°).

For example, in one embodiment of the retroreflective material of the present invention, when the incident angle of incident light is changed from 5° to 50° with respect to the plane direction, *h (hue) can be changed within the range of 40 to 250, for example.

More specifically, in the retroreflective material of the present invention, when the layer thickness $L_{(90°)}$ of the transparent resin layer 2 is set to 590 nm, the layer thickness $L_{(30°)}$/layer thickness $L_{(90°)}$ is set to 1.46, and the layer thickness of the reflective layer 3 is set to 150 nm, if the incident angle of incident light is changed from 0 to approximately 50°, the color tone can be sequentially changed to yellow, yellowish yellow-green, yellow-green, and greenish yellow-green colors (see Example 5 below). Further, for example, in the retroreflective material of the present invention, when the layer thickness $L_{(90°)}$ of the transparent resin layer 2 is set to 590 nm, the layer thickness $L_{(30°)}$/layer thickness $L_{(90°)}$ is set to 1.46, and the layer thickness of the reflective layer 3 is set to 110 or 140 nm, if the incident angle of incident light is changed from 0° to approximately 50°, the color tone can be sequentially changed to red-orange, orange, yellow-orange, and yellow colors (see Examples 1 and 2 below).

The retroreflective performance of the retroreflective material of the present invention is preferably such that the maximum value of the retroreflective performance when the incident angle is changed from 5 to 50° is 30 to 150 $cd/lx/m^2$, more preferably 30 to 100 $cd/lx/m^2$, and still more preferably 30 to 60 $cd/lx/m^2$. For example, a conventional retroreflective material that exhibits a monochromatic color tone, in which Al, for example, is used as the constituent material of the transparent metal compound thin film forming the reflective layer, generally has retroreflective performance of 200 $cd/lx/m^2$ or more, from the viewpoint of enhancing visibility at nighttime. In the case of such retroreflective performance of 200 $cd/lx/m^2$ or more, however, the color of reflected light may possibly become white. On the other hand, in the retroreflective material of the present invention, the maximum value of the retroreflective performance when the incident angle is changed from 5 to 50° is 30 to 150 $cd/lx/m^2$, so that the color of the reflected light is unlikely to become white, and the retroreflective material is more likely to show high chroma for incident light with a wide angle, and is also more likely to change the color tone of the reflected light depending on the incident angle of the incident light more effectively. To achieve a maximum value in the range of 30 to 150 $cd/lx/m^2$ of the above-described retroreflective performance when the incident angle is changed from 5 to 50°, the layer thickness $L_{(90°)}$ of the transparent resin layer is set to 400 to 1000 nm, and the ratio of the layer thickness $L_{(30°)}$ to the layer thickness $L_{(90°)}$ is set to 1.35 to 1.50, and additionally, conditions such as the layer thickness of the reflective layer 3 or the type of the constituent material of the transparent metal compound thin film forming the reflective layer 3 may be adjusted.

The retroreflective material of the present invention can be used for various applications such as safety clothing, apparel, bags, suitcases, shoes, road markings, retroreflective-type photoelectric sensors, and touch panels (for example, infrared retroreflective detection-type touch panels).

3. Method for Producing Retroreflective Material

While the method for producing the retroreflective material of the present invention is not particularly limited as long as it can provide the retroreflective material with the above-described structure, the method may include the following steps 1 to 6, by way of example:

step 1: heating a release support in which a thermoplastic film is laminated on a base film, at a temperature equal to or higher than the softening point of the thermoplastic film to soften the thermoplastic film;

step 2: prior to, simultaneously with, or subsequent to step 1, dispersing transparent microspheres 1 over the thermoplastic film of the release support, and cooling the resulting material to cure the thermoplastic film at the time when the transparent microspheres 1 have been embedded at a predetermined ratio in the softened thermoplastic film, to obtain a release support in which the transparent microspheres 1 are embedded;

step 3: forming the transparent resin layer 2 to achieve the above-described layer thickness, on the transparent microsphere 1 side of the release support having the transparent microspheres 1 embedded therein;

step 4: laminating the reflective layer 3 on the transparent resin layer 2 formed in step 3;

step 5: laminating the fixing resin layer 4 on the reflective layer 3 formed in step 4, by applying a resin forming the fixing resin layer 4; and step 6: bonding the fixing resin layer 4 with the support 5 subsequent to removing the release support, or removing the release support subsequent to bonding the fixing resin layer 4 with the support 5.

While the base film of the release support used in step 1 is not particularly limited as long as it can stably retain its shape at the softening temperature of the thermoplastic film, examples of the base film include polyester films such as polyethylene terephthalate and polyethylene naphthalate. As the thermoplastic film of the release support used in step 1, a resin film that softens at low temperature is preferred. Examples of such resin films include polyolefin resin films such as polyethylene and polypropylene. The thickness of the thermoplastic film of the release support used in step 1 may be set depending on the average particle size or the like of the transparent microspheres 1.

In the second step, the transparent microspheres 1 are embedded in the thermoplastic film, as a result of gravity settling of the transparent microspheres 1 placed on the thermoplastic film in the softened state. Thus, the size and density of the transparent microspheres 1, as well as the density and thickness of the thermoplastic film, for example, are considered in the first step, and then in the second step, the degree of embedding the transparent microspheres into the thermoplastic film may be controlled by controlling the degree of softening of the thermoplastic film, by appropriately adjusting the heating temperature and time for softening. The portions of the transparent microspheres embedded in the thermoplastic film are exposed in the air in the retroreflective material of the present invention.

The third step is performed subsequent to the second step, after the thermoplastic film is returned to the cured state by being cooled or allowed to cool. For forming the transparent resin layer 2 to achieve the above-described layer thickness in the third step, an exemplary method may be used that involves applying, onto the transparent microsphere 1 side of the release support having the microspheres 1 embedded therein, a solution for forming the transparent resin layer 2 in which the resin forming the transparent resin layer 2 is dissolved or dispersed with a relatively low solids concentration, and then drying.

In the above-described solution for forming the transparent resin layer 2, the concentration of the resin forming the transparent resin layer 2 is specifically 1 to 6 mass %, preferably 1.2 to 5.0 mass %, still more preferably 1.2 to 3.0 mass %, and particularly preferably 1.2 to 2.0 mass %, for example. By setting the concentration of the resin forming the transparent resin layer 2 to a low concentration as defined above in the solution for forming the transparent resin layer 2, the above-described conditions for the layer thickness can be satisfied for the transparent resin layer 2.

While the type of the solvent for dissolving or dispersing the resin forming the transparent resin layer 2 is not particularly limited in the above-described solution for forming the transparent resin layer 2, examples of solvents include solvents having boiling points of 70° C. or higher at normal pressure, such as toluene, cyclohexanone, N,N-dimethylformamide (DMF), methyl ethyl ketone (MEK), and isopropyl alcohol (IPA). These solvents may be used alone or in combination of two or more. In particular, of these solvents, when a combination of two solvents having different boiling points (preferably two solvents differing in boiling point by approximately 30 to 50° C.) is used, the transparent resin layer 2 can be provided with the above-described layer thickness more effectively. More specifically, when a combination of two solvents differing in boiling point by approximately 30 to 50° C. is used in the above-described solution for forming the transparent resin layer 2, the solvent with a lower boiling point is first evaporated upon drying, causing the transparent resin layer 2 to be formed on the transparent microsphere 1, including a top portion (the portion of the layer thickness $L_{(90°)}$) of the transparent microsphere 1, as well as between transparent microspheres 1 (the portion of the layer thickness $L_{(-)}$), and subsequently, the transparent resin layer is sequentially formed in portions other than the top portion of the transparent microsphere 1 while the solvent with a higher boiling point is flowing down from the top portion of the transparent microsphere 1. This allows the formation of the transparent resin layer 2 having the layer thickness $L_{(90°)}$ as well as the layer thickness $L_{(30°)}$/layer thickness $L_{(90°)}$ described above.

A preferred example of the combination of two solvents in the above-described solution for forming the transparent resin layer 2 is the combination of toluene and cyclohexanone, from the viewpoint of satisfying more preferred ranges of the layer thickness $L_{(90°)}$ and the layer thickness $L_{(30°)}$/layer thickness $L_{(90°)}$ described above.

When two solvents differing in boiling point are used in the above-described solution for forming the transparent resin layer 2, the mixture ratio of the two solvents is specifically 3:7 to 7:3, and preferably 4:6 to 6:4, for example, in terms of the volume ratio of the solvent with a higher boiling point to the solvent with a lower boiling point.

While the viscosity of the above-described solution for forming the transparent resin layer 2 is not particularly limited, the viscosity of the above-described solution for forming the transparent resin layer 2 as measured using Zahn cup No. 3 at 25° C. is 5 to 20 seconds, preferably 5 to 15 seconds, and more preferably 6 to 12 seconds, for example.

In the third step, the amount of the above-described solution for forming the transparent resin layer 2 to be applied may be set as appropriate, depending on the layer thickness of the transparent resin layer 2 to be imparted; however, it is 10 to 60 g/m$^2$, preferably 15 to 50 g/m$^2$, and more preferably 20 to 40 g/m$^2$, for example.

In the third step, the conditions for drying the above-described solution for forming the transparent resin layer 2 are a duration of 1 to 4 minutes at 120 to 190° C., preferably a duration of 1 to 3 minutes at 130 to 180° C., for example, although are not particularly limited thereto. Particularly when the combination of toluene and cyclohexanone is used as the solvent for the above-described solution for forming the transparent resin layer 2, preferred conditions for drying the solution for forming the transparent resin layer 2 are a duration of 1 to 2 minutes at 150 to 180° C., for example.

In the fourth step, for forming the reflective layer 3, a metal film may be formed by vapor deposition on the transparent resin layer 2. Here, from the viewpoint of changing the color tone of reflected light depending on the incident angle of incident light, while reducing the occurrence of color unevenness more effectively, deposition is preferably performed onto the transparent resin layer 2, using vacuum deposition as the vapor deposition method, at an angle of approximately 90° between the plane direction of the retroreflective material and the emission direction of the evaporation source.

In the fifth step, the resin forming the fixing resin layer 4 may be applied onto the reflective layer, using a known resin coating method.

In the sixth step, the method of bonding the fixing resin layer 4 with the support 5 is not particularly limited, and may be a known lamination method, for example.

EXAMPLES

The present invention will be specifically described below with reference to examples, which are not intended to limit the invention.

1. Production of Retroreflective Materials

Example 1

A release support made of a 40-μm-thick polyethylene film laminated on a 75-μm-thick polyester film was used, and the release support was heated at 200° C. for 2 minutes to melt the polyethylene film. In this state, transparent glass beads with an average particle size of 50 μm and a refractive index of 1.93 as transparent microspheres were dispersed in an amount of 220 to 300 transparent glass beads/mm$^2$ over substantially one surface, and the resulting material was allowed to cool to cure the polyethylene film. Then, 27 g/m$^2$ of a solution for forming the transparent resin layer having the following formulation 1 was applied onto the transparent glass bead-side of the release support, and dried at a temperature of 155° C. for a duration of 1.5 minutes, thus forming the transparent resin layer. The layer thicknesses of the transparent resin layer formed were as follows: the layer thickness $L_{(90°)}$: 590 nm, the layer thickness $L_{(60°)}$: 630 nm, the layer thickness $L_{(30°)}$: 860 nm, the layer thickness $L_{(-)}$: 10500 nm; and the layer thickness $L_{(30°)}$/layer thickness $L_{(90°)}$: 1.46.

[Formulation 1]
Polyurethane resin (pure content): 1.5 mass %
Toluene (purity: 99% or more): 49.25 mass %
Cyclohexanone (purity: 99% or more): 49.25 mass %
Viscosity: 7 seconds (25° C., Zahn cup No. 3)

The measurements on the transparent resin layer were performed using the following method. First, a plurality of transparent microspheres having the transparent resin layer formed thereon were cut out from the sheet obtained above, using a cutter knife. Then, the transparent microspheres were observed with a scanning electron microscope, and one in which the glass microsphere was partly exposed through gaps in the transparent resin layer was extracted. Using this extracted transparent microsphere, the layer thickness $L_{(90°)}$, layer thickness $L_{(60°)}$, and layer thickness $L_{(30°)}$ were measured. For measurement of the layer thickness $L_{(-)}$, a portion without the transparent microspheres in the sheet obtained above was cut out with a cutter knife, and the cross section of this portion was observed with a scanning electron microscope.

Next, a reflective layer having a layer thickness of 110 nm was formed by depositing ZnS onto the transparent resin layer, using vacuum deposition, at an angle of approximately 90° between the plane direction of the retroreflective material and the emission direction of the evaporation source.

Further, polyethylene terephthalate (hereinafter sometimes abbreviated as PET) was applied onto the reflective layer, thus forming a fixing resin layer. A polyester-cotton taffeta fabric (black color) used as a support was subsequently bonded to the fixing resin layer using a hot press at 130° C., and then the release support was removed.

In this way, a retroreflective material was obtained sequentially including the polyester-cotton taffeta fabric (support)/PET (fixing resin layer)/the ZnS film (reflective layer)/the transparent resin layer/the transparent microspheres. The exposure ratio of the transparent microspheres in the retroreflective material was measured to be 48%.

Example 2

A retroreflective material was produced under the same conditions as those in Example 1, except that the layer thickness of the reflective layer was changed to 140 nm.

Example 3

A retroreflective material was produced under the same conditions as those in Example 2, except that a solution for forming the transparent resin layer having the following formulation 2 was used instead of the solution for forming the transparent resin layer having the formulation 1. The layer thicknesses of the transparent resin layer formed were as follows: the layer thickness $L_{(90°)}$: 880 nm, the layer thickness $L_{(60°)}$: 990 nm, the layer thickness $L_{(30°)}$: 1240 nm, the layer thickness $L_{(-)}$: 11700 nm; and the layer thickness $L_{(30°)}$/layer thickness $L_{(90°)}$: 1.41.

[Formulation 2]
Polyurethane resin (pure content): 6.0 mass %
Toluene (purity: 99% or more): 47 mass %
Cyclohexanone (purity: 99% or more): 47 mass %
Viscosity: 10 seconds (25° C., Zahn cup No. 3)

Example 4

A retroreflective material was produced under the same conditions as those in Example 1, except that the layer thickness of the reflective layer was changed to 130 nm.

Example 5

A retroreflective material was produced under the same conditions as those in Example 1, except that the layer thickness of the reflective layer was changed to 150 nm.

Example 6

A retroreflective material was produced under the same conditions as those in Example 1, except that the layer thickness of the reflective layer was changed to 170 nm.

Example 7

A retroreflective material was produced under the same conditions as those in Example 1, except that the layer thickness of the reflective layer was changed to 190 nm.

Example 8

A retroreflective material was produced under the same conditions as those in Example 1, except that a solution for forming the transparent resin layer having the following formulation 3 was used instead of the solution for forming the transparent resin layer having the formulation 1, and the amount of the solution for forming the transparent resin layer applied was changed to 26 g/m². The layer thicknesses of the transparent resin layer formed were as follows: the layer thickness $L_{(90°)}$: 560 nm, the layer thickness $L_{(60°)}$: 600 nm, the layer thickness $L_{(30°)}$: 820 nm, the layer thickness $L_{(-)}$: 10280 nm; and the layer thickness $L_{(30°)}$/layer thickness $L_{(90°)}$: 1.46.

[Formulation 3]
Polyurethane resin (pure content): 1.0 mass %
Toluene (purity: 99% or more): 49.5 mass %
Cyclohexanone (purity: 99% or more): 49.5 mass %
Viscosity: 5 seconds (25° C., Zahn cup No. 3)

Example 9

A retroreflective material was produced under the same conditions as those in Example 1, except that a solution for forming the transparent resin layer having the following formulation 4 was used instead of the solution for forming the transparent resin layer having the formulation 1, and the amount of the solution for forming the transparent resin layer applied was changed to 29 g/m². The layer thicknesses of the transparent resin layer formed were as follows: the layer thickness $L_{(90°)}$: 680 nm, the layer thickness $L_{(60°)}$: 750 nm, the layer thickness $L_{(30°)}$: 980 nm, the layer thickness $L_{(-)}$: 10960 nm; and the layer thickness $L_{(30°)}$/layer thickness $L_{(90°)}$: 1.44.

[Formulation 4]
Polyurethane resin (pure content): 3.0 mass %
Toluene (purity: 99% or more): 48.5 mass %
Cyclohexanone (purity: 99% or more): 48.5 mass %
Viscosity: 8 seconds (25° C., Zahn cup No. 3)

Example 10

A retroreflective material was produced under the same conditions as those in Example 1, except that a solution for forming the transparent resin layer having the following formulation 5 was used instead of the solution for forming the transparent resin layer having the formulation 1, and the amount of the solution for forming the transparent resin layer applied was changed to 30 g/m². The layer thicknesses of the transparent resin layer formed were as follows: the layer thickness $L_{(90°)}$: 770 nm, the layer thickness $L_{(60°)}$: 860 nm, the layer thickness $L_{(30°)}$: 1100 nm, the layer thickness $L_{(-)}$: 11000 nm; and the layer thickness $L_{(30°)}$/layer thickness $L_{(90°)}$: 1.42.

[Formulation 5]
Polyurethane resin (pure content): 4.5 mass %
Toluene (purity: 99% or more): 47.75 mass %
Cyclohexanone (purity: 99% or more): 47.75 mass %
Viscosity: 9 seconds (25° C., Zahn cup No. 3)

Comparative Example 1

A retroreflective material was produced under the same conditions as those in Example 1, except that the application of the solution for forming the transparent resin layer having the formulation 1 was omitted, and a reflective layer having a layer thickness of 110 nm was formed by depositing ZnS onto the glass microspheres, using vacuum deposition, at an angle of approximately 90° between the plane direction of the retroreflective material and the emission direction of the evaporation source.

Comparative Example 2

A retroreflective material was produced under the same conditions as those in Example 1, except that a solution for forming the transparent resin layer having the following formulation 6 was used instead of the solution for forming the transparent resin layer having the formulation 1, and the amount of the solution for forming the transparent resin layer applied was changed to 60 g/m². The layer thicknesses of the transparent resin layer formed were as follows: the layer thickness $L_{(90°)}$: 5200 nm, the layer thickness $L_{(60°)}$: 10300 nm, the layer thickness $L_{(30°)}$: 18700 nm, the layer thickness $L_{(-)}$: 22000 nm; and the layer thickness $L_{(30°)}$/layer thickness $L_{(90°)}$: 3.60.

[Formulation 6]
Polyurethane resin (pure content): 25 mass %
Toluene (purity: 99% or more): 75 mass %
Viscosity: 270 seconds (25° C., Zahn cup No. 3)

2. Method of Evaluating Retroreflective Materials

Figure 2:
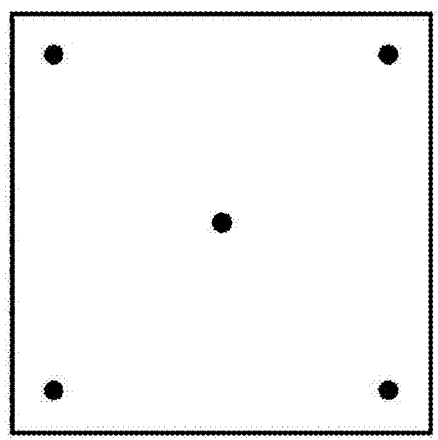
FIG. 2 is a diagram showing measured spots for evaluating the characteristics of the retroreflective material, wherein • represents a measured spot.

Characteristics of each of the retroreflective materials produced above were evaluated. Specifically, the reflective performance of the retroreflective material was evaluated in accordance with "Retroreflective materials" defined in JIS Z 9117, as follows: a sample was prepared by cutting each of the retroreflective materials to a size of 20 cm×20 cm, and x, y, and L (x, y: chromaticity coordinates, L: luminance) were determined using the light source A defined by the CIE (International Commission on Illumination), and using a colorimeter (BM-5AS; Topcon Positioning Systems, Inc.) at an observation angle of 12', and at each of incident angles of 5°, 10°, 20°, 30°, 40°, 50°, 60°, and 70°. As shown in FIG. 2, x, y, and L were measured for a total of five spots, i.e., the central point of the sample, and points 1 cm inward vertically and horizontally from the respective vertices of the sample.

Then, x, y, and L were converted to a*, b*, and L* in accordance with the following equations, and h* (hue) and C* (chroma) were determined in accordance with the following equations:

$$x=X/X+Y+Z \quad y=Y/X+Y+Z \quad L=10Y^{1/2}$$

$$L^*=116(Y/100)^{1/3}$$

$$a^*=500((X/98.05)^{1/3}-(Y/100)^{1/3})$$

$$b^*=200((Y/100)^{1/3}-(Z/118.10)^{1/3})$$

$$h^*=\mathrm{ATAN}(b^*/a^*)$$

$$C^*=\{(a^*)^2+(b^*)^2\}(1/2)$$

Further, the retroreflective performance was evaluated in the range of incident angles of 5 to 70°. The retroreflective performance was evaluated in accordance with the method defined in JIS Z 9117 (2010).

Further, color unevenness in each of the retroreflective materials was evaluated in accordance with the following determination criteria:

A: Of the measured spots (four spots) other than the central point of the sample, there is no spot whose h* differs by 60 or more from the h* of the above-described central point of the sample, at each of incident angles of 5°, 10°, 20°, 30°, 40°, 50°, 60°, and 70°.

B: Of the measured spots (four spots) other than the central point of the sample, there is one spot whose h* differs by 60 or more from the h* of the above-described central point of the sample, at each of incident angles of 5°, 10°, 20°, 30°, 40°, 50°, 60°, and 70°.

C: Of the measured spots (four spots) other than the central point of the sample, there are two spots whose h* differs by 60 or more from the h* of the above-described central point of the sample, at each of incident angles of 5°, 10°, 20°, 30°, 40°, 50°, 60°, and 70°.

D: Of the measured spots (four spots) other than the central point of the sample, there are three or four spots whose h* differs by 60 or more from the h* of the above-described central point of the sample, at each of incident angles of 5°, 10°, 20°, 30°, 40°, 50°, 60°, and 70°.

3. Results of Evaluating Retroreflective Materials

Figure 3:
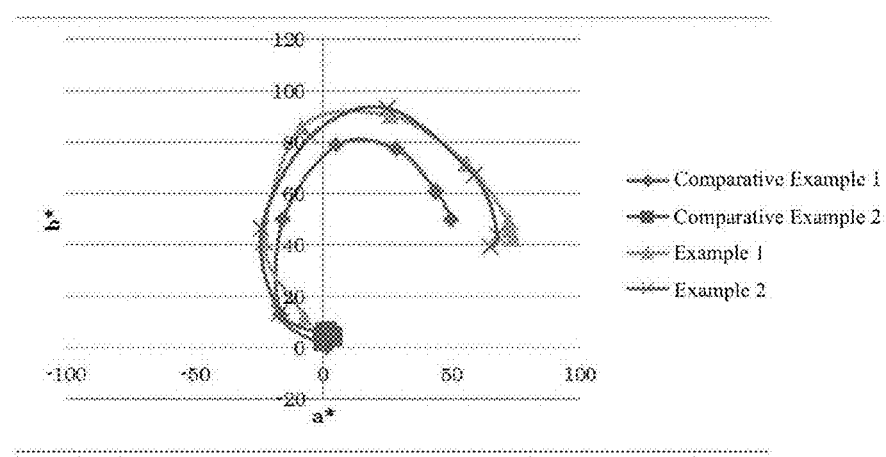
FIG. 3 is a chromaticity diagram of the retroreflective materials of Examples 1 and 2, and Comparative Examples 1 and 2.
Figure 4:
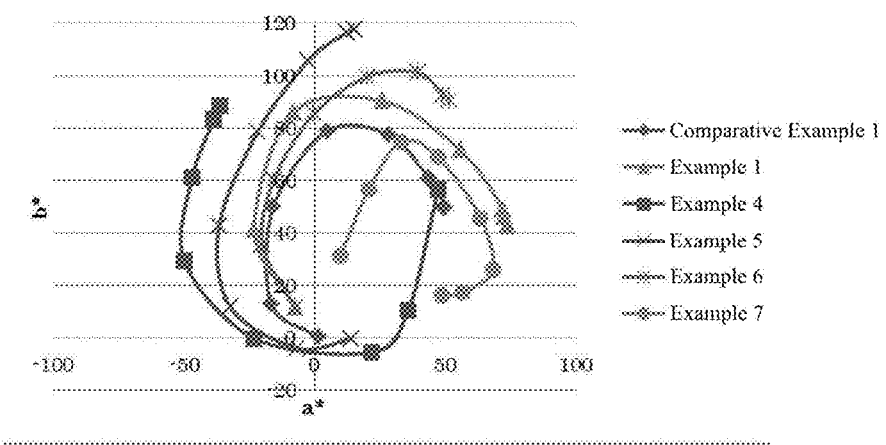
FIG. 4 is a chromaticity diagram of the retroreflective materials of Examples 1 and 4 to 7, and Comparative Example 1.
Figure 5:
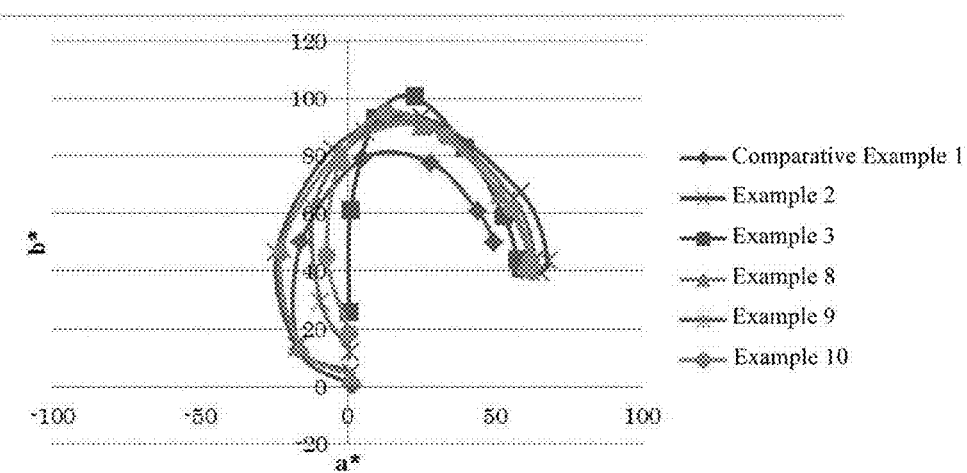
FIG. 5 is a chromaticity diagram of the retroreflective materials of Examples 2, 3, and 8 to 10, and Comparative Example 1.

For each of the retroreflective materials, L*, a*, b*, h*, and C*, the apparent color (the color visually seen under a fluorescent lamp), an average value of C* in the range of incident angles of 5° to 50° of incident light, a maximum difference in h* in the range of incident angles of 5° to 50° of incident light (the difference between the maximum and minimum values of h* in the range of 5° to 50°), reflective performance, and color unevenness were evaluated. The results are shown in Tables 1 to 6. FIGS. 3 to 5 show chromaticity diagrams of each of the retroreflective materials. As a result, the retroreflective material without a transparent resin layer (Comparative Example 1) showed color unevenness. Further, the retroreflective material including a transparent resin layer, but not having a layer thickness $L_{(90°)}$ of 400 to 1000 nm and a layer thickness $L_{(90°)}$/layer thickness $L_{(30°)}$ of 1.35 to 1.50 (Comparative Example 2), had low C* (chroma), and did not exhibit sufficient retroreflective performance. In contrast, the retroreflective materials each including a transparent resin layer having a layer thickness $L_{(90°)}$ of 400 to 1000 nm and having a layer thickness $L_{(30°)}$/layer thickness $L_{(90°)}$ of 1.35 to 1.50 (Examples 1 to 10), had high C* (chroma), exhibited sufficient retroreflective performance, had a large maximum difference in h* in the range of 50 to 50°, were capable of changing the color tone of reflected light depending on the incident angle of incident light, and had reduced unevenness in the color of the reflected light. In particular, the retroreflective materials of Examples 2, 5, and 9, in which the layer thickness $L_{(90°)}$ was 570 to 700 nm, the ratio of the layer thickness $L_{(30°)}$ to the layer thickness $L_{(90°)}$ was 1.44 to 1.46, and the layer thickness of the reflective layer was 140 to 160 nm, were outstanding in terms of C* (chroma), maximum difference in h* in the range of 5° to 50°, retroreflective performance, and reduced unevenness in the color of reflected light.

TABLE 1

| | Transparent Resin Layer | | | | | Reflective Layer | Evaluation Results | | | |
| | | | | | | Layer Thickness | Incident Angle of Incident | | | |
| | $L_{(20°)}$ (nm) | $L_{(60°)}$(nm) | $L_{(30°)}$(nm) | $L_{(30°)}/L_{(20°)}$ | $L_{(60°)}/L_{(20°)}$ | (nm) | Light | L* | a* | b* |
|---|---|---|---|---|---|---|---|---|---|---|
| Comparative Example 1 | — | — | — | — | — | 140 | 5° | 75.2 | 49.71 | 48.82 |
| | | | | | | | 10° | 73.94 | 50.01 | 49.85 |
| | | | | | | | 20° | 76.69 | 43.85 | 60.92 |
| | | | | | | | 30° | 81.47 | 28.36 | 77.46 |
| | | | | | | | 40° | 82.29 | 4.92 | 78.81 |
| | | | | | | | 50° | 70.39 | −15.93 | 49.94 |
| | | | | | | | 60° | 44.03 | −16.76 | 12.98 |
| | | | | | | | 70° | 16.82 | 1.76 | 0.28 |
| Comparative Example 2 | 5200 | 10300 | 18700 | 3.6 | 1.98 | 140 | 5° | 40.36 | 4.21 | 3.65 |
| | | | | | | | 10° | 33.56 | 4.3 | 3.9 |
| | | | | | | | 20° | 27.04 | 3.79 | 5.3 |
| | | | | | | | 30° | 20.06 | 1.99 | 6.98 |
| | | | | | | | 40° | 10.61 | 0.28 | 6.9 |
| | | | | | | | 50° | 4.98 | −0.86 | 5.13 |
| | | | | | | | 60° | 2.39 | −0.73 | 1.97 |
| | | | | | | | 70° | 1.06 | 0.06 | 3.86 |

| | | | | Evaluation Results | | | | |
| | h* | C* | Color of Reflected Light | Retroreflective Performance (cd/lx/m²) | Apparent Color | Average Value of C* from 5° to 50° | Average Value of h* from 5° to 50° | Evaluation Result of Color Unevenness |
|---|---|---|---|---|---|---|---|---|
| Comparative Example 1 | 45.06 | 70.38 | Orange | 34.9 | Black | 71.65 | 62.79 | x |
| | 44.91 | 70.61 | Orange | 34.3 | | | | |
| | 54.26 | 75.06 | Yellow-Orange | 35.6 | | | | |
| | 69.89 | 82.49 | Yellow-Orange | 37.8 | | | | |
| | 86.43 | 78.96 | Yellow | 38.2 | | | | |
| | 107.69 | 52.42 | Yellowish Yellow-Green | 32.7 | | | | |
| | 142.35 | 21.17 | Yellow-Green | 20.4 | | | | |
| | 9.01 | 1.78 | Orange | 7.8 | | | | |
| Comparative Example 2 | 40.92 | 5.57 | Orange | 18.7 | Black | 6.2 | 58.6 | ☺ |
| | 42.21 | 5.81 | Orange | 15.6 | | | | |
| | 54.48 | 6.52 | Orange | 12.5 | | | | |
| | 74.09 | 7.26 | Yellow-Green | 9.3 | | | | |

TABLE 1-continued

| | | | |
|---|---|---|---|
| 87.68 | 6.91 | Yellow | 4.9 |
| 99.52 | 5.2 | Yellow | 2.3 |
| 110.33 | 2.1 | Yellowish Yellow-Green | 1.1 |
| 89.11 | 3.86 | Yellow | 0.5 |

The values of each of L*, a*, b*, h*, and C* shown in the table were measured with respect to the central point of the sample.

TABLE 2

| | Transparent Resin Layer | | | | | Reflective Layer | Evaluation Results | | | |
|---|---|---|---|---|---|---|---|---|---|---|
| | | | | | | Layer Thickness | Incident Angle of Incident | | | |
| | $L_{(20°)}$ (nm) | $L_{(60°)}$ (nm) | $L_{(30°)}$ (nm) | $L_{(30°)}/L_{(20°)}$ | $L_{(60°)}/L_{(20°)}$ | (nm) | Light | L* | a* | b* |
| Example 1 | 590 | 630 | 860 | 1.46 | 1.07 | 110 | 5° | 81.82 | 72.65 | 46.09 |
| | | | | | | | 10° | 80.4 | 73.97 | 42.8 |
| | | | | | | | 20° | 81.97 | 72.27 | 49.34 |
| | | | | | | | 30° | 81.11 | 55.78 | 71.61 |
| | | | | | | | 40° | 80.67 | 26.15 | 90.38 |
| | | | | | | | 50° | 77.44 | −8.33 | 85.94 |
| | | | | | | | 60° | 55.05 | −23.21 | 41.19 |
| | | | | | | | 70° | 22.59 | −7.51 | 11.53 |
| Example 2 | 590 | 630 | 860 | 1.46 | 1.07 | 140 | 5° | 80.55 | 65.3 | 39.31 |
| | | | | | | | 10° | 82.11 | 67.95 | 43.4 |
| | | | | | | | 20° | 91.17 | 58.81 | 67.11 |
| | | | | | | | 30° | 92.33 | 25.02 | 93.25 |
| | | | | | | | 40° | 82.14 | −4.98 | 82.37 |
| | | | | | | | 50° | 68.45 | −24.18 | 46.48 |
| | | | | | | | 60° | 44.98 | −16.99 | 13.68 |
| | | | | | | | 70° | 19.19 | 1.22 | 4.93 |

| | | | Evaluation Results | | | | | |
|---|---|---|---|---|---|---|---|---|
| | h* | C* | Color of Reflected Light | Retroreflective Performance (cd/lx/m²) | Apparent Color | Average Value of C* from 5° to 50° | Average Value of h* from 5° to 50° | Evaluation Result of Color Unevenness |
| Example 1 | 32.39 | 86.03 | Red-Orange | 38.0 | Yellow-Green | 88.37 | 65.49 | ◉ |
| | 30.05 | 85.46 | Red-Orange | 37.3 | | | | |
| | 34.32 | 87.51 | Orange | 38.0 | | | | |
| | 52.08 | 90.77 | Yellow-Orange | 37.6 | | | | |
| | 73.87 | 94.09 | Yellow-Orange | 37.4 | | | | |
| | 95.54 | 86.35 | Yellow | 35.9 | | | | |
| | 119.39 | 47.28 | Yellowish Yellow-Green | 25.5 | | | | |
| | 123.1 | 13.76 | Yellowish Yellow-Green | 10.5 | | | | |
| Example 2 | 31.05 | 76.22 | Red-Orange | 36.4 | Yellow-Green | 79.59 | 86.44 | ◉ |
| | 32.57 | 80.63 | Red-Orange | 36.8 | | | | |
| | 48.77 | 89.23 | Orange | 40.3 | | | | |
| | 74.98 | 96.55 | Yellow-Orange | 42 | | | | |
| | 93.46 | 82.52 | Yellow | 40.2 | | | | |
| | 117.49 | 52.39 | Yellowish Yellow-Green | 34.6 | | | | |
| | 141.15 | 21.82 | Yellow-Green | 23.2 | | | | |
| | 76.11 | 5.08 | Yellow-Green | 9.7 | | | | |

The values of each of L*, a*, b*, h*, and C* shown in the table were measured with respect to the central point of the sample.

TABLE 3

| | Transparent Resin Layer | | | | | Reflective Layer | Evaluation Results | | | |
|---|---|---|---|---|---|---|---|---|---|---|
| | | | | | | Layer Thickness | Incident Angle of Incident | | | |
| | $L_{(20°)}$ (nm) | $L_{(60°)}$ (nm) | $L_{(30°)}$ (nm) | $L_{(30°)}/L_{(20°)}$ | $L_{(60°)}/L_{(20°)}$ | (nm) | Light | L* | a* | b* |
| Example 3 | 880 | 990 | 1240 | 1.41 | 1.13 | 140 | 5° | 74.05 | 58.64 | 40.7 |
| | | | | | | | 10° | 73.89 | 57.66 | 43.92 |
| | | | | | | | 20° | 78.49 | 53.03 | 59.09 |

TABLE 3-continued

|  |  |  |  |  |  |  | 30° | 87.01 | 39.72 | 82.78 |
|---|---|---|---|---|---|---|---|---|---|---|
|  |  |  |  |  |  |  | 40° | 95.44 | 22.54 | 100.55 |
|  |  |  |  |  |  |  | 50° | 86.88 | 9.47 | 92.97 |
|  |  |  |  |  |  |  | 60° | 60.03 | 0.99 | 61.19 |
|  |  |  |  |  |  |  | 70° | 24.35 | 0.43 | 25.77 |
| Example 4 | 590 | 630 | 860 | 1.46 | 1.07 | 130 | 5° | 104.92 | −36.34 | 88.6 |
|  |  |  |  |  |  |  | 10° | 102.99 | −38.61 | 83.39 |
|  |  |  |  |  |  |  | 20° | 93.32 | −46.93 | 61.39 |
|  |  |  |  |  |  |  | 30° | 75.81 | −49.92 | 29.12 |
|  |  |  |  |  |  |  | 40° | 56.28 | −23.11 | −0.24 |
|  |  |  |  |  |  |  | 50° | 43.76 | 21.89 | −5.55 |
|  |  |  |  |  |  |  | 60° | 36.32 | 35.97 | 10.5 |
|  |  |  |  |  |  |  | 70° | 71.17 | 47.44 | 56.71 |

| | | | Evaluation Results | | | | | |
|---|---|---|---|---|---|---|---|---|
| | h* | C* | Color of Reflected Light | Retroreflective Performance (cd/lx/m$^2$) | Apparent Color | Average Value of C* from 5° to 50° | Average Value of h* from 5° to 50° | Evaluation Result of Color Unevenness |
| Example 3 | 34.77 | 71.38 | Orange | 34.4 | Purple | 85.26 | 49.42 | ◉ |
| | 37.29 | 72.49 | Orange | 34.3 | | | | |
| | 48.09 | 79.4 | Orange | 36.4 | | | | |
| | 64.37 | 91.82 | Yellow-Orange | 40.4 | | | | |
| | 77.37 | 103.04 | Yellow-Orange | 44.3 | | | | |
| | 84.19 | 93.45 | Yellow | 40.3 | | | | |
| | 89.08 | 61.2 | Yellow | 27.9 | | | | |
| | 89.05 | 25.77 | Yellow | 11.3 | | | | |
| Example 4 | 112.3 | 95.76 | Yellowish Yellow-Green | 48.7 | Yellow | 61.4 | 233.48 | ◉ |
| | 114.85 | 91.89 | Yellowish Yellow-Green | 47.8 | | | | |
| | 127.4 | 77.27 | Yellow-Green | 43.3 | | | | |
| | 149.74 | 57.79 | Yellowish Yellow-Green | 35.2 | | | | |
| | 180.6 | 23.11 | Green | 26.1 | | | | |
| | 345.78 | 22.58 | Reddish Red-Purple | 20.3 | | | | |
| | 16.27 | 37.47 | Red-Orange | 16.9 | | | | |
| | 50.09 | 73.93 | Orange | 33 | | | | |

The values of each of L*, a*, b*, h*, and C* shown in the table were measured with respect to the central point of the sample.

TABLE 4

| | Transparent Resin Layer | | | | | Reflective Layer | Evaluation Results | | | | |
|---|---|---|---|---|---|---|---|---|---|---|---|
| | $L_{(20″)}$ (nm) | $L_{(60″)}$ (nm) | $L_{(30″)}$ (nm) | $L_{(30″)}/L_{(20″)}$ | $L_{(60″)}/L_{(20″)}$ | Thickness (nm) | Incident Angle of Incident Light | L* | a* | b* | h* |
| Example 5 | 590 | 630 | 860 | 1.46 | 1.07 | 150 | 5° | 102.4 | 15.58 | 117.57 | 82.45 |
| | | | | | | | 10° | 102.97 | 12.6 | 116.44 | 83.83 |
| | | | | | | | 20° | 103.41 | −2.56 | 105.55 | 91.39 |
| | | | | | | | 30° | 97.28 | −21.82 | 78.73 | 105.49 |
| | | | | | | | 40° | 82.51 | −36.68 | 42.74 | 130.63 |
| | | | | | | | 50° | 61.24 | −32.45 | 11.78 | 160.04 |
| | | | | | | | 60° | 38.14 | −6.75 | −3.94 | 210.25 |
| | | | | | | | 70° | 18.77 | 14.09 | −0.53 | 357.34 |
| Example 6 | 590 | 630 | 860 | 1.46 | 1.07 | 170 | 5° | 96.34 | 51.81 | 90.6 | 60.24 |
| | | | | | | | 10° | 96.74 | 49.23 | 92.56 | 61.99 |
| | | | | | | | 20° | 101.42 | 39.55 | 101.21 | 68.66 |
| | | | | | | | 30° | 98.98 | 20.5 | 99.69 | 78.38 |
| | | | | | | | 40° | 91.82 | −0.11 | 85.48 | 90.07 |
| | | | | | | | 50° | 77.58 | −15.72 | 60.3 | 104.61 |
| | | | | | | | 60° | 57.07 | −20.09 | 35.27 | 119.67 |
| | | | | | | | 70° | 22.59 | −7.51 | 11.53 | 123.1 |

TABLE 4-continued

| | | Evaluation Results | | | | | |
|---|---|---|---|---|---|---|---|
| | C* | Color of Reflected Light | Retroreflective Performance (cd/lx/m²) | Apparent Color | Average Value of C* from 5° to 50° | Average Value of h* from 5° to 50° | Evaluation Result of Color Unevenness |
| Example 5 | 118.6 | Yellow | 47.5 | Blue | 85.64 | 77.59 | ◎ |
| | 117.12 | Yellow | 47.8 | | | | |
| | 105.58 | Yellow | 48 | | | | |
| | 81.69 | Yellowish Yellow-Green | 45.1 | | | | |
| | 56.32 | Yellow-Green | 38.3 | | | | |
| | 34.52 | Greenwish Yellow-Green | 28.4 | | | | |
| | 7.81 | Blue-Green | 17.7 | | | | |
| | 14.1 | Red | 8.7 | | | | |
| Example 6 | 104.37 | Yellow-Orange | 44.7 | Green | 94.58 | 44.37 | ◎ |
| | 104.84 | Yellow-Orange | 44.9 | | | | |
| | 108.67 | Yellow-Orange | 47.1 | | | | |
| | 101.78 | Yellow-Orange | 45.9 | | | | |
| | 85.48 | Yellow | 42.6 | | | | |
| | 62.31 | Yellowish Yellow-Green | 36 | | | | |
| | 40.59 | Yellowish Yellow-Green | 26.5 | | | | |
| | 13.76 | Yellowish Yellow-Green | 15.3 | | | | |

The values of each of L*, a*, b*, h*, and C* shown in the table were measured with respect to the central point of the sample.

TABLE 5

| | Transparent Resin Layer | | | | | Reflective Layer | Evaluation Results | | | | |
|---|---|---|---|---|---|---|---|---|---|---|---|
| | $L_{(20'')}$ (nm) | $L_{(60'')}$ (nm) | $L_{(30'')}$ (nm) | $L_{(30'')}/L_{(20'')}$ | $L_{(60'')}/L_{(20'')}$ | Layer Thickness (nm) | Incident Angle of Incident Light | L* | a* | b* | h* |
| Example 7 | 590 | 630 | 860 | 1.46 | 1.07 | 190 | 5° | 70.35 | 48.91 | 16.34 | 18.47 |
| | | | | | | | 10° | 70.47 | 56.57 | 17.13 | 16.84 |
| | | | | | | | 20° | 72.8 | 68.27 | 25.95 | 20.82 |
| | | | | | | | 30° | 77.24 | 63.51 | 46 | 35.92 |
| | | | | | | | 40° | 80.81 | 47.29 | 69.14 | 55.63 |
| | | | | | | | 50° | 74.73 | 33.23 | 74.9 | 66.07 |
| | | | | | | | 60° | 54.57 | 20.92 | 56.69 | 69.75 |
| | | | | | | | 70° | 29.27 | 9.86 | 31.04 | 72.38 |
| Example 8 | 560 | 600 | 820 | 1.46 | 1.07 | 140 | 5° | 81.27 | 60.41 | 41.91 | 34.75 |
| | | | | | | | 10° | 83.02 | 61.99 | 43.95 | 35.34 |
| | | | | | | | 20° | 92.58 | 51.77 | 66.35 | 52.04 |
| | | | | | | | 30° | 92.92 | 25.05 | 90.33 | 74.5 |
| | | | | | | | 40° | 80.66 | −2.38 | 81.13 | 91.68 |
| | | | | | | | 50° | 66.4 | −22.57 | 47.75 | 115.3 |
| | | | | | | | 60° | 43.31 | −16.19 | 13.68 | 139.8 |
| | | | | | | | 70° | 18.62 | 1.35 | 3.68 | 69.85 |

| | | Evaluation Results | | | | | |
|---|---|---|---|---|---|---|---|
| | C* | Color of Reflected Light | Retroreflective Performance (cd/lx/m²) | Apparent Color | Average Value of C* from 5° to 50° | Average Value of h* from 5° to 50° | Evaluation Result of Color Unevenness |
| Example 7 | 51.56 | Red-Orange | 32.6 | Brown (Orange) | 71.3 | 49.23 | ◎ |
| | 59.11 | Red-Orange | 32.7 | | | | |
| | 73.03 | Red-Orange | 33.8 | | | | |
| | 78.42 | Orange | 35.8 | | | | |
| | 83.76 | Orange | 37.5 | | | | |
| | 81.94 | Yellow-Orange | 34.7 | | | | |

TABLE 5-continued

|  |  |  |  |  |  |  |  |
|---|---|---|---|---|---|---|---|
|  | 60.43 | Yellow-Orange | 25.3 |  |  |  |  |
|  | 32.57 | Yellow-Orange | 13.6 |  |  |  |  |
| Example 8 | 73.52 | Orange | 37.7 | Yellow-Green | 76.9 | 80.6 | Δ |
|  | 75.99 | Orange | 38.5 |  |  |  |  |
|  | 84.16 | Orange | 43 |  |  |  |  |
|  | 93.74 | Yellow-Orange | 43.1 |  |  |  |  |
|  | 81.16 | Yellow | 37.4 |  |  |  |  |
|  | 52.82 | Yellowish Yellow-Green | 30.8 |  |  |  |  |
|  | 21.2 | Yellow-Green | 20.1 |  |  |  |  |
|  | 3.92 | Yellow-Orange | 8.6 |  |  |  |  |

The values of each of L*, a*, b*, h*, and C* shown in the table were measured with respect to the central point of the sample.

TABLE 6

| | Transparent Resin Layer | | | | | Reflective Layer | Evaluation Results | | | | |
|---|---|---|---|---|---|---|---|---|---|---|---|
| | | | | | | Layer | Incident Angle | | | | |
| | $L_{(20'')}$ (nm) | $L_{(60'')}$ (nm) | $L_{(30'')}$ (nm) | $L_{(30'')}/L_{(20'')}$ | $L_{(60'')}/L_{(20'')}$ | Thickness (nm) | of Incident Light | L* | a* | b* | h* |
| Example 9 | 680 | 750 | 980 | 1.44 | 1.1 | 140 | 5° | 78.38 | 62.08 | 39.77 | 32.64 |
| | | | | | | | 10° | 79.37 | 63.52 | 43.75 | 34.56 |
| | | | | | | | 20° | 86.94 | 56.68 | 64.44 | 48.67 |
| | | | | | | | 30° | 90.56 | 30.29 | 89.67 | 71.34 |
| | | | | | | | 40° | 86.57 | 5.91 | 86.34 | 86.17 |
| | | | | | | | 50° | 74.59 | −11.69 | 61.89 | 100.7 |
| | | | | | | | 60° | 50 | −9.11 | 29.25 | 107.3 |
| | | | | | | | 70° | 20.91 | 0.96 | 11.88 | 85.38 |
| Example 10 | 770 | 860 | 1100 | 1.43 | 1.12 | 140 | 5° | 76.22 | 61.86 | 40.42 | 33.16 |
| | | | | | | | 10° | 76.63 | 62.09 | 43.57 | 35.06 |
| | | | | | | | 20° | 82.72 | 55.96 | 61.67 | 47.78 |
| | | | | | | | 30° | 88.78 | 33.28 | 86.72 | 69.01 |
| | | | | | | | 40° | 91.01 | 12.73 | 94.94 | 82.36 |
| | | | | | | | 50° | 80.74 | −2.57 | 77.74 | 91.89 |
| | | | | | | | 60° | 55.01 | −7.05 | 45.53 | 98.8 |
| | | | | | | | 70° | 22.63 | 0.69 | 18.28 | 87.84 |

| | | Evaluation Results | | | | | |
|---|---|---|---|---|---|---|---|
| | C* | Color of Reflected Light | Retroreflective Performance (cd/lx/m²) | Apparent Color | Average Value of C* from 5° to 50° | Average Value of h* from 5° to 50° | Evaluation Result of Color Unevenness |
| Example 9 | 73.73 | Red-Orange | 36.4 | Yellow-Green | 80.5 | 68.1 | ◎ |
| | 77.13 | Orange | 36.8 | | | | |
| | 85.82 | Orange | 40.3 | | | | |
| | 94.65 | Yellow-Orange | 42 | | | | |
| | 88.54 | Yellow | 40.2 | | | | |
| | 62.98 | Yellow | 34.6 | | | | |
| | 30.64 | Yellowish Yellow-Green | 23.2 | | | | |
| | 11.92 | Yellow | 9.7 | | | | |
| Example 10 | 73.89 | Red-Orange | 35.4 | Yellow | 83.5 | 58.7 | ◎ |
| | 75.85 | Orange | 35.6 | | | | |
| | 83.27 | Orange | 38.4 | | | | |
| | 92.89 | Yellow-Orange | 41.2 | | | | |
| | 95.79 | Yellow | 42.2 | | | | |
| | 77.78 | Yellow | 37.5 | | | | |
| | 46.07 | Yellow | 25.5 | | | | |
| | 18.29 | Yellow | 10.5 | | | | |

The values of each of L*, a*, b*, h*, and C* shown in the table were measured with respect to the central point of the sample.

REFERENCE SIGNS LIST

1 Transparent microsphere
2 Transparent resin layer
3 Reflective layer
4 Fixing resin layer
5 Support

The invention claimed is:

1. A retroreflective material comprising:
a fixing resin layer;
a transparent microsphere embedded in the fixing resin layer; and
a transparent resin layer and a reflective layer formed of a transparent metal compound thin film, between the transparent microsphere and the fixing resin layer, sequentially from the transparent microsphere side,
the transparent resin layer having a layer thickness $L_{(90°)}$ of 400 to 1000 nm and having a ratio of a layer thickness $L_{(30°)}$ to the layer thickness $L_{(90°)}$ of 1.35 to 1.50, where:
layer thickness $L_{(90°)} = Y_{(90°)} - X_{(90°)}$;
layer thickness $L_{(30°)} = Y_{(30°)} - X_{(30°)}$;
$X_{(90°)}$: a distance from a central point of the transparent microsphere to an interface between the transparent microsphere and the transparent resin layer in a 90° direction with respect to a plane direction;
$Y_{(90°)}$: a distance from the central point of the transparent microsphere to an interface between the transparent resin layer and the reflective layer in the 90° direction with respect to the plane direction;
$X_{(30°)}$: a distance from the central point of the transparent microsphere to the interface between the transparent microsphere and the transparent resin layer in a 30° direction with respect to the plane direction; and
$Y_{(30°)}$: a distance from the central point of the transparent microsphere to the interface between the transparent resin layer and the reflective layer in the 30° direction with respect to the plane direction.

2. The retroreflective material according to claim 1, wherein the transparent resin layer has a ratio of a layer thickness $L_{(60°)}$ to the layer thickness $L_{(90°)}$ of 1.01 to 1.25, where:
layer thickness $L_{(60°)} = Y_{(60°)} - X_{(60°)}$;
$X_{(60°)}$: a distance from the central point of the transparent microsphere to the interface between the transparent microsphere and the transparent resin layer in a 60° direction with respect to the plane direction; and
$Y_{(60°)}$: a distance from the central point of the transparent microsphere to the interface between the transparent resin layer and the reflective layer in the 60° direction with respect to the plane direction.

3. The retroreflective material according to claim 1, wherein the reflective layer has a layer thickness of 90 to 240 nm.

4. The retroreflective material according to claim 1, wherein a ratio of the layer thickness of the reflective layer to the layer thickness $L_{(90°)}$ of the transparent resin layer is 100:120-1300.

5. The retroreflective material according to claim 1, wherein a resin forming the transparent resin layer is a polyurethane resin.

6. The retroreflective material according to claim 1, wherein a constituent material of the transparent metal compound thin film forming the reflective layer is ZnS.

7. The retroreflective material according to claim 1, wherein the transparent microsphere is made of glass.

8. The retroreflective material according to claim 1, wherein the transparent microsphere has a refractive index of 1.6 to 2.5.

9. The retroreflective material according to claim 1, wherein the fixing resin layer is held on a support.

* * * * *